United States Patent [19]

Kronick et al.

[11] 3,844,894
[45] Oct. 29, 1974

[54] APPARATUS FOR PERFORMING ASSAYS ON REACTIONS THAT PRODUCE RADIOACTIVE GASES

[75] Inventors: Melvyn H. Kronick, Stamford, Calif.; Samuel H. Wilson, Bethesda, Md.

[73] Assignee: The United States of America as represented by the Secretary of Department of Health, Education and Welfare, Washington, D.C.

[22] Filed: Aug. 30, 1971

[21] Appl. No.: 175,903

[52] U.S. Cl. ........ 195/127, 195/103.5 R, 23/230 B, 23/254 R
[51] Int. Cl. ........................................... G01n 31/14
[58] Field of Search ...... 250/435 MR, 71.5 R, 71 R; 23/230 B, 253 R, 254; 195/103.5 R

[56] References Cited
OTHER PUBLICATIONS

Slater et al., "Anal. Chem." 36:1888 (1964).

Benson et al., "Int. J. Appl. Radiation and Isotopes" 17:488–489 (1966).

*Primary Examiner*—Alvin E. Tanenholtz
*Assistant Examiner*—Max D. Hensley

[57] ABSTRACT

A method for performing assays on reactions that produce radioactive gases. Reaction components are placed in the reaction well of an open bottomed container. The reaction is sealed except for an aperture through which evolved radioactive gases can escape. A tent-like cover of scintillation plastic surrounds the aperture. When the radioactive gases strike the plastic, scintillations will be emitted and may be counted by a standard scintillation counter. This method is particularly useful in performing enzyme assays.

1 Claim, 4 Drawing Figures

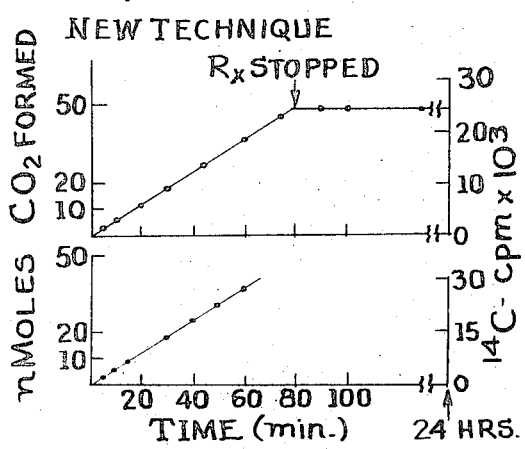
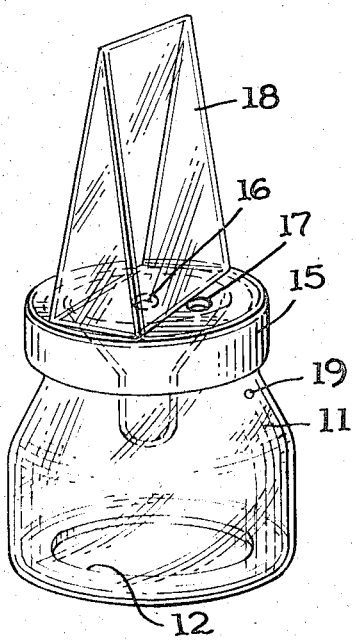
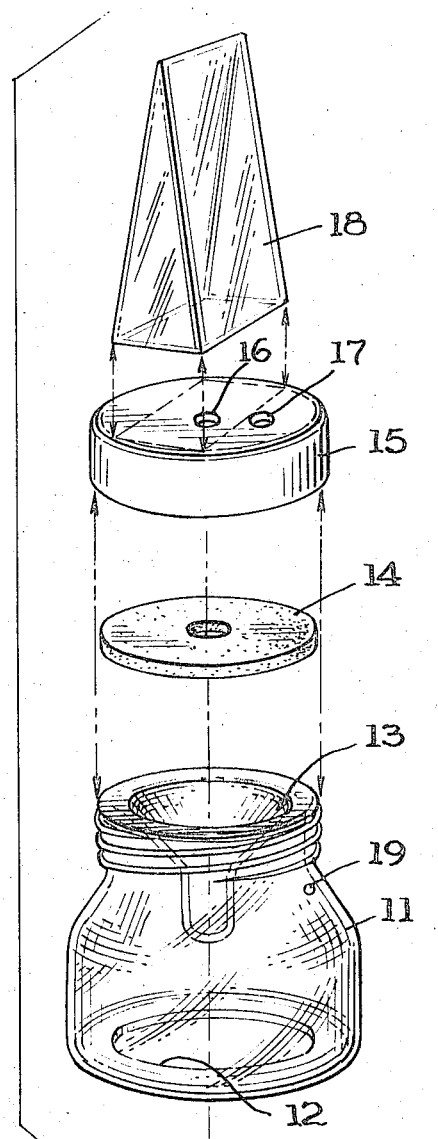
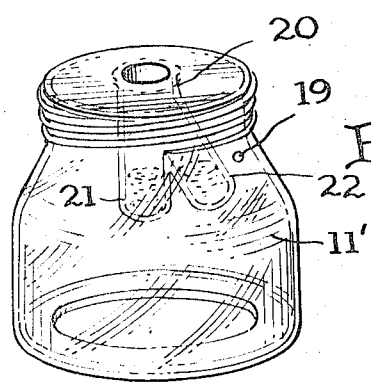
INVENTORS
MELVYN N. KRONICK
SAMUEL H. WILSON
BY Browdy and Neimark
ATTORNEYS

APPARATUS FOR PERFORMING ASSAYS ON REACTIONS THAT PRODUCE RADIOACTIVE GASES

The present invention relates to a method and apparatus for performing assays on reactions that produce radioactive gases.

Radioactive gases evolved during chemical reactions can be detected by a number of techniques. These include direct determination of radioactivity in ionization chambers, proportional counters, and Geiger-Muller tubes; gas-solid scintillation counting in containers of solid scintillator such as anthracene, scintillator plastic, and scintillator glass; and absorption of radioactive gases by liquid or solid trapping agents and subsequent radioassay by Geiger-Muller or liquid scintillation counting.

This third technique has recently become the most popular for routine radioassay of biological reactions usually involving absorption of $^{14}CO_2$ by bases such as KOH, Hyamine hydroxide, and phenethylamine followed by liquid scintillation counting. This technique is reproducible and gives quantitative recovery of $^{14}CO_2$ as well as high (>70 percent) counting efficiencies. Such technique, however, is inconvenient for routine assays because absorption of $CO_2$ by trapping agents is time-consuming and because cumbersome manipulations are often necessary to transfer solutions containing absorbed $CO_2$ to counting vials. Additional disadvantages are that determinations of reaction rates are difficult to perform on single reaction mixtures, and that many $CO_2$ absorbers are volatile and can produce dramatic inhibition of enzyme reactions when included with reaction components in a closed assay system.

The present invention is a new technique in which many of the above disadvantages do not occur. It is simple and rapid and gives good counting efficiencies. In addition, assays of reaction rates may be easily performed on single mixtures.

In accordance with the preferred embodiment, a closed-system reaction device is employed consisting of a glass reaction well and a hollow tent-shaped piece of scintillator plastic. Radioactive gases evolved during reactions taking place in the reaction well are contained in the scintillator plastic tent and are evaluated using commercially available liquid scintillation counters.

It is, accordingly, an object of the present invention to overcome the deficiencies of the prior art, such as indicated above.

It is another object of the present invention to provide a method of making radioassays of gas producing reactions which is simple and rapid.

It is another object to provide a method by which assays of reaction rates at different points of time may easily be performed on single reaction mixtures.

A further object is to provide a device for carrying out the method of the present invention.

These and other objects will be more clear from the following description of specific embodiments as shown in the drawing in which:

FIG. 1 is a perspective view of a device in accordance with the present invention;

FIG. 2 is an exploded perspective view of the same device shown in FIG. 1; and

FIG. 3 is a perspective view of another embodiment of the device.

FIG. 4 shows results using the present invention and a conventional technique.

Referring to FIGS. 1 and 2, the lower portion of the device consists of an open-bottom glass scintillation vial 11 and a glass reaction well 13 with a flared top which is incorporated into the vial. The bottom of the vial 11 is rounded to facilitate movement of the device in automatic scintillation spectrometers. The bottom of the vial 11 is open at 12 so that the temperature of the reaction well 13 may be controlled by immersion in liquid. A small hole 19 is positioned in the wall of vial 11 to prevent trapping of air.

The upper portion of the device consists of a plastic screw-on scintillation vial cap 15 fitted with a tent-shaped piece of transparent scintillator plastic 18. The scintillator tent 18 is affixed to the cap 15 such as by a suitable adhesive. Two holes 16 and 17 are provided in the plastic cap 15, the center hole 16 connecting the scintillator tent 18 and the reaction well 13 below. The second hole 17 is located next to the scintillator tent 18 for injection of material into the reaction well 13.

A soft diaphragm 14 with a single hole in the center is attached in the cap 15, such as by gluing therein, to help provide a gastight reaction system; such diaphragm 14 may be formed of any suitable soft and resistant material such as silicone rubber. The top of the reaction well 13 is flared to facilitate introduction of reagents by injection through the hole 17 in the cap 15 next to the scintillator tent 18.

An alternate design for the lower portion of the device is shown in FIG. 3. The vial 11' has a reaction well 20 which is divided into two sections 21 and 22. The sections 21 and 22 are connected so that solutions may be transferred from one well to the other by tilting. In this way, reactions may be altered with appropriate agents simply by tilting the chambers.

The counting efficiency of a device according to the present invention was determined to be 49 percent and remains constant over a large change in the amount of counted gas, as can be seen by Example I.

EXAMPLE I

The counting efficiency of $^{14}C$ in the assay device shown in FIG. 2 was determined by placing various known quantities of $^{14}C$-$NaHCO_3$ in the reaction wells of separate assay devices and liberating $^{14}CO_2$ with 3NHCl. Variable amounts of $^{14}C$-sodium bicarbonate in 1.0N NaOH were pipetted into reaction wells of the assay devices. All samples were then brought to a final volume of 0.05 ml. with 1.0N NaOH and next the assay devices were sealed. Then 0.1 ml. 3N HCl were added by injection and the samples were counted in a Beckman model LS-250 spectrometer. Less than 0.1 percent of the total radioactivity was found to remain in the acidified bicarbonate solution. Background count rates of 23 cpm for the scintillator plastic device were substracted from each valve before calculation of percent counting efficiency. Per cent counting efficiency was calculated from observed count rate and amount of $^{14}C$-$NaHCO_3$ added. Results are shown on Table I.

TABLE I

| N Moles $CO_2$ in assay device | % counting efficiency |
|---|---|
| 0.009 | 49 |

TABLE I-Continued

| N Moles $CO_2$ in assay device | % counting efficiency |
| --- | --- |
| 0.09 | 49 |
| 0.9 | 49 |
| 9 | 49 |
| 90 | 49 |

It can be seen that the efficiency of counting is approximately 49 percent and was constant over the range tested. The capacity of plastic scintillator to give comparable counting efficiencies over this range is expected since its decay time is reported to be less than $10^{-8}$ sec. Time required for equilibration of $^{14}CO_2$ between the reaction well and scintillator tent is less than 2 min. Rotation of the assay device in the chambers of three scintillation spectrometers tested results in less than 1 percent difference in counting efficiency.

It should be understood that the method of the present invention can be used to determine the amount of gaseous product evolved in almost any chemical reaction. If a radioactive isotope is used for one of the elements in the gaseous compound it can be quantitatively measured simply and easily by the present device. As radioactive isotopes are now known for almost every element, the technique of the present invention could be used for almost any chemical reaction.

One assay for which the present invention is particularly suited is in the determination of activity of $CO_2$-producing enzymes. A comparison of the present technique with one conventional technique, known in the prior art is presented in Example II.

EXAMPLE II

Assays of L-glutamic acid decarboxylase are performed using crude homogenates of newborn mouse brain. In a volume of 0.05 ml., the reaction mixtures contain: 50mM $KPO_4$ buffer, pH 6.8; 1mM EDTA (ethylene diamine tetracetic acid), K salt, 0.5% (v/v); Triton X-100 (alkyl phenoxy polyethoxy ethanol), 0.5 mM pyridoxal phosphate monohydrate; 1mM 2-mercaptoethanol; 5mM 1-$^{14}$C-L-glutamate, K salt (Sp. act. 9.2 dpm/p mole); and 0.5mg of homogenate protein. Incubation is at 37°C. for variable times.

The conventional $CO_2$ assay technique used in this example utilizes the principle of absorption of radioactive gases by liquid trapping agents and subsequent radioassay by liquid scintillation counting. In brief, the reaction chamber consists of a 10 ml. Erlenmeyer flask equipped with a 0.4 ml. glass center well and tightfitting rubber serum bottle stopper. Reaction components are placed in the center well, the flask is sealed and the reaction mixture is incubated at 37°C. The reaction is stopped by injecting 0.2 ml. 0.01 M acetic acid in methanol into the center well. After the reaction is stopped, 1 ml. Hyamine hydroxide (p-diisobutylcresoxyethoxyethyldimethylbenzylammonium hydroxide) is injected into the outer portion of the reaction vessel for collection of $CO_2$. After allowing $CO_2$ to be absorbed for 30 minutes at 37°C., 0.9 ml. aliquots of the Hyamine solution are transferred to glass scintillation vials and counted with 10 ml. of toluene/Liquifluor scintillation mix (100 g/l. 2,5-diphenyloxazole and 1.25 g/l. of p-Bis 2(5-phenyloxazolyl) benzene in toluene).

It should be noted that for many enzymes, batch reactions of many separate incubations may be started and stopped simply by rapidly changing the temperature of incubation mixtures. Reaction components are pipetted into the center wells of the present assay devices at 0° – 0.5°C. The devices are then sealed by screwing on the upper portions. Reactions are simultaneously started by transferring the sealed assay devices to a 37°C. water bath. Reactions are terminated by removing the devices to a 0° – 0.5°C. water bath and introducing an appropriate enzyme-inactivating agent, in this case 10mM acetic acid in methanol. The reaction rates may be determined by simply placing the assay device in a scintillation spectrometer for brief intervals during the course of the reaction.

Results of the determinations of L-glutamic acid decarboxylase activity made on the same enzyme extract using the technique of the present invention and the conventional technique described above are shown in FIG. 4. No corrections are made in the count rates for background counts. Each point obtained by the conventional technique represents an average of data from three separate reaction mixtures. "Rx stopped" in the top graph refers to the point at which the reaction was stopped by addition of 10mM acetic acid in methanol.

It can be seen that the rates of production of enzyme product, $^{14}CO_2$, are comparable for the two methods. The data obtained using the technique of the present invention (FIG. 4, upper graph), however, derive from a single reaction mixture placed for 15 second counting periods in a spectrometer, whereas the conventional method requires a minimum of 9 reaction mixtures for the data shown in FIG. 4 (27 reaction mixtures are used in this particular experiment).

Both gas-solid and liquid phase scintillation counting are performed on a Backman model LS-250 spectrometer operated at 25° using a full $^3$H-$^{14}$C window. The scintillator plastic used as the material for the tent of the present invention is Pilot B scintillator plastic (p-terphenyl and p,p'-diphenylstilbene in a matrix of polyvinyltoluene) from the Pilot Chemicals Division, New England Nuclear Corp. It is obvious that other transparent scintillator plastics known in the art may also be used with the assay device of the present invention.

The assay device of the present invention is used with gas-solid scintillation counting for the assay of gas-producing reactions. The new technique is simple and rapid and gives good counting efficiencies of $^{14}CO_2$. It is useful for determination of enzyme activities on a routine basis.

It will be obvious to those skilled in the art that various changes may be made without departing from the scope of the invention and the invention is not to be considered limited to what is shown in the drawings and described in the specification.

What is claimed is:

1. A device for detecting the evolution of radioactive gases, comprising a container, a sealable cap thereon, a gas vent in said cap, and a tent-like cover of scintillator plastic surrounding said gas vent and attached to said cap, wherein said container includes a main chamber and an auxiliary chamber communicating at the upper portion thereof with the upper portion of said main chamber, whereby a tilting of said container will cause the contents of said auxiliary chamber to flow into said main chamber.

* * * * *